(12) United States Patent
Elmdahl et al.

(10) Patent No.: US 8,798,629 B2
(45) Date of Patent: Aug. 5, 2014

(54) METHODS AND ARRANGEMENTS FOR CELL IDENTIFICATION IN A RADIO NETWORK

(75) Inventors: Per Elmdahl, Linköping (SE); Fredrik Gunnarsson, Linköping (SE); Ove Linnell, Sturefors (SE); Johan Moe, Mantorp (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 87 days.

(21) Appl. No.: 13/377,676

(22) PCT Filed: Dec. 30, 2010

(86) PCT No.: PCT/SE2010/051497
§ 371 (c)(1),
(2), (4) Date: Dec. 12, 2011

(87) PCT Pub. No.: WO2012/091646
PCT Pub. Date: Jul. 5, 2012

(65) Prior Publication Data
US 2012/0276906 A1    Nov. 1, 2012

(51) Int. Cl.
*H04W 36/30* (2009.01)
(52) U.S. Cl.
USPC ............ 455/437; 455/436; 370/331; 370/332
(58) Field of Classification Search
USPC .......................... 455/436–439; 370/331, 332
See application file for complete search history.

(56) References Cited

U.S. PATENT DOCUMENTS

2007/0264996 A1* 11/2007 Vikberg .................... 455/426.1
2010/0210268 A1*  8/2010 Lim et al. .................. 455/436

OTHER PUBLICATIONS

International Search Report and Written Opinion mailed Aug. 31, 2011 in corresponding Application No. PCT/SE2010/051497.
Ericsson et al: "Method for ANR Support in UTRAN", 3GPP Draft, R2-106442, Method for ANR Support in UTRAN, vol. RAN WG2, Nov. 9, 2010, XP050492277.
ZTE: "Considerations on ANR for UTRAN", 3GPP Draft; R2-103739, Considerations on ANR for UTRAN, vol. RAN WG2, Jun. 21, 2010, XP050451043.
European Communication dated Apr. 23, 2014 in European Application No. 10 807 502.9-1854.

\* cited by examiner

*Primary Examiner* — Cong Tran
(74) *Attorney, Agent, or Firm* — Nixon & Vanderhye P.C.

(57) ABSTRACT

A method in a radio network node for identifying a candidate cell for handover of a user equipment is provided. The radio network node receives, from the user equipment, a first cell identifier associated with the candidate cell. The radio network node signals a cell identification request to at least one base station serving a cell using the first cell identifier. The cell identification request comprises a user equipment identifier associated with the user equipment (102), and requests any cell wherein the user equipment associated with the user equipment identifier can be detected. The radio network node receives a cell identification response comprising a second cell identifier associated with a detecting cell, served by a detecting base station, wherein the user equipment associated with the user equipment identifier is detected. The radio network node then identifies the candidate cell based on the received second cell identifier.

30 Claims, 9 Drawing Sheets

METHODS AND ARRANGEMENTS FOR CELL IDENTIFICATION IN A RADIO NETWORK

This application is the U.S. national phase of International Application No. PCT/SE2010/051497 filed 30 Dec. 2010 which designated the U.S., the entire contents of which is hereby incorporated by reference.

TECHNICAL FIELD

Embodiments herein relate to radio network nodes and methods in a radio network node. In particular, embodiments herein relate to methods for identifying a candidate cell for handover of a user equipment. Embodiments herein further relate to base stations and methods in a base station for assisting a radio network node in identifying a candidate cell for handover of a user equipment.

BACKGROUND

In a typical cellular radio network, also referred to as a wireless communication system, User Equipments (UEs) communicate via a Radio Access Network (RAN) to one or more core networks (CNs).

The user equipment is the mobile terminal by which a subscriber can access services offered by an operator's core network.

The user equipments may be mobile stations or user equipment units such as mobile telephones, also known as "cellular" telephones, and laptops with wireless capability, and thus may be, for example, portable, pocket, hand-held, computer-included, or car-mounted mobile devices which communicate voice and/or data with the radio access network.

Each cell in the cellular radio network covers a geographical area. A cell is served by Radio Base Station (RBS) equipment at a radio base station site. That is, the radio base station provides radio coverage in the cell and communicates over an air interface with user equipment units operating on radio frequencies within its range.

A radio base station is in some radio networks also called "eNB", "eNodeB", "NodeB" or "B node", and will in this document be referred to as a Base Station (BS).

In some versions of the radio access network, several base stations are controlled, e.g. via landlines or radio link, by a Radio Network Controller (RNC). The radio network controller, also sometimes termed a Base Station Controller (BSC), supervises and coordinates various activities of the plural base stations connected thereto. The radio network controllers are typically connected to one or more core networks.

The cell from within which the communication between a user equipment and a base station is communicated, is referred to as the serving cell for that user equipment.

A radio link is a representation of a radio connection between a user equipment and a base station.

The radio links between the user equipments and the base stations are configured by a radio network controller. This involves assigning a user equipment identifier associated with the user equipment. In UTRAN, this user equipment identifier is associated to an uplink scrambling code that base stations may use to detect and time align a user equipment in the uplink communications. The uplink communication is the communication from the user equipment to the base station.

To support mobility of user equipments between cells in a cellular radio network, so called handovers must be performed. Handovers are necessary for example when a user equipment, such as a mobile telephone, leaves one cell and moves into another cell. Otherwise, for example an ongoing call would be dropped, due to loss of radio coverage.

A handover may be a change of serving cell, so that a user equipment being served by one cell, becomes served by another, so called candidate cell, instead.

A handover may also mean addition of a radio link to a candidate cell without removing established radio links to other cells; or replacement of one of the existing radio links by a radio link to a candidate cell. Communication that involves a multitude of cells may be referred to as macro diversity, soft handover, softer handover or coordinated multipoint, etc. The set of cells with which the user equipment have radio links is referred to as the active set.

Hence, a handover includes the setup of a radio link connection between the user equipment and the candidate cell, so that the candidate cell may become the serving cell for the user equipment. The radio links are managed by the radio network controller, which receives measurement reports from user equipments about candidate cells and based on reported information decides about additions, replacements and removals of radio links.

To enable handovers, the different cells in the cellular radio system must be identifiable. Therefore, each cell in the radio access network broadcasts a well-defined signature sequence that reveals its identity.

Some of the broadcast cell identities are reused in the radio access network, and are therefore not globally unique. In UTRAN, the reused cell identity is the downlink scrambling code, and in LTE, it is the physical cell identity.

In addition to the reused cell identities, unique cell identifiers, so called Cell Global Identifiers (CGIs), may also be broadcast from within each cell.

To discover candidate cells for handover, the user equipments may perform measurements to detect a broadcast cell identity.

To facilitate the handling of handovers, neighbor cell relations (NCR) have been introduced in many radio access networks. In a neighbor cell relation there is sufficient information about the cells in question to provide for a possible handover of a user equipment between the cells experiencing the neighbor cell relation. Such requested information may comprise for example information regarding cell identity, as well as information regarding which radio network node that is controlling the base station, serving the cell in question. For the purpose of radio network node identification, each radio network node may be associated with a unique radio network node identifier.

In UTRAN, the user equipment is, from the radio network controller it is served by, provided with a list of plausible candidate cells for handover, a so called neighbor cell list, for its current serving cell. In case the user equipment has radio links associated with multiple cells, it is provided with a neighbor cell list that the radio network controller has derived based on the neighbour cell lists of the cells in its active set.

The information needed to provide the neighbour cell lists may for example be compiled through drive tests, planning tool computations, and/or user equipment assisted measurements.

An example of the later is the Automatic Neighbor Relation (ANR) function in 3GPP LTE, where the user equipment reports both the non-unique cell identifier as well as the globally unique cell identifier upon request from serving cell.

LTE ANR is a promising feature to ensure self-configuration in the network. However, a similar feature is more difficult to introduce in other cellular radio systems, such as for example UTRAN, due to an installed base of legacy user equipments which do not support the provision of information such as for example the reporting or decoding of unique cell identities for candidate cells for handover as described above.

Moreover, user equipment measurement and/or decoding for cell identification purposes may require user equipment functionality which for cost or complexity reasons are undesirable.

SUMMARY

In view of the discussion above, it is an object for embodiments herein to provide an improved way of identifying a candidate cell in a radio access network.

According to a first aspect, the object is achieved by a method in a first radio network node for identifying a candidate cell for handover of a user equipment. The first radio network node controls at least one base station. The first radio network node and the candidate cell are comprised in a radio communication system. The first radio network node receives, from the user equipment, a first cell identifier associated with the candidate cell.

The first radio network node signals a cell identification request to at least one base station serving a cell using the first cell identifier. The cell identification request comprises a user equipment identifier associated with the user equipment, and requests any cell wherein the user equipment associated with the user equipment identifier can be detected.

The first radio network node receives a cell identification response comprising a second cell identifier associated with a detecting cell, served by a detecting base station, wherein the user equipment associated with the user equipment identifier is detected.

The first radio network node then identifies the candidate cell based on the received second cell identifier associated with the detecting cell.

According to a second aspect, the object is achieved by a first radio network node for identifying a candidate cell for handover of a user equipment. The first radio network node controls at least one base station, and the first radio network node and the candidate cell are comprised in a radio communication system.

The first radio network node comprises a receiver configured to receive from the user equipment, a first cell identifier associated with the candidate cell.

The first radio network node further comprises a transmitter configured to signal a cell identification request to at least one base station serving a cell using the first cell identifier.

The cell identification request comprises a user equipment identifier associated with the user equipment and requests any cell wherein the user equipment associated with the user equipment identifier can be detected.

The receiver is further configured to receive a cell identification response comprising a second cell identifier associated with a detecting cell, served by a detecting base station, wherein the user equipment associated with the user equipment identifier is detected.

The first radio network node further comprises an identification unit configured to identify the candidate cell based on the received second cell identifier associated with the detecting cell.

According to a third aspect, the object is achieved by a method in a second radio network node for assisting a first radio network node in identifying a candidate cell for handover of a user equipment. The second radio network node serves a base station.

The second radio network node, the first radio network node, and the candidate cell are comprised in a radio communication system.

The second radio network node receives from the first radio network node, a cell identification request comprising a user equipment identifier associated with the user equipment, which requests any cell wherein the user equipment associated with the user equipment identifier can be detected.

The second radio network node signals the cell identification request to at least one base station serving a cell using the first cell identifier.

The second radio network node then receives from a detecting base station an indication that the user equipment associated with the user equipment identifier has been detected in a detecting cell.

The second radio network node signals to the first radio network node, a cell identification response comprising a second cell identifier associated with the detecting cell.

According to a fourth aspect, the object is achieved by a second radio network node for assisting a first radio network node in identifying a candidate cell for handover of a user equipment. The second radio network node serves a base station.

The second radio network node, the first radio network node and the candidate cell are comprised in a radio communication system.

The second base station comprises a receiver configured to receive from the first radio network node a cell identification request comprising a user equipment identifier associated with the user equipment.

The cell identification request requests any cell wherein the user equipment associated with the user equipment identifier can be detected.

The second radio network node further comprises a transmitter configured to signal the cell identification request to at least one base station serving a cell using the first cell identifier.

The receiver is further configured to receive from a detecting base station an indication that the user equipment associated with the user equipment identifier has been detected in a detecting cell.

The transmitter is further configured to signal to the first radio network node a cell identification response comprising a second cell identifier associated with the detecting cell.

According to a fifth aspect, the object is achieved by a method in a base station serving at least one cell, for assisting a radio network node in identifying a candidate cell for handover of a user equipment.

The base station, the radio network node and the candidate cell are comprised in a radio communication system.

The base station receives from the radio network node a cell identification request comprising a user equipment identifier associated with the user equipment.

The cell identification request requests any cell wherein the user equipment associated with the user equipment identifier can be detected.

The base station then detects a cell wherein the user equipment associated with the user equipment identifier can be detected, and signals to the radio network node an indication that the user equipment associated with the user equipment identifier has been detected in the detecting cell.

According to a sixth aspect, the object is achieved by a base station serving at least one cell, for assisting a radio network node in identifying a candidate cell for handover of a user equipment.

The base station, the radio network node and the candidate cell are comprised in a radio communication system.

The base station comprises a receiver configured to receive from the radio network node a cell identification request comprising a user equipment identifier associated with the user equipment.

The cell identification request requests any cell wherein the user equipment associated with the user equipment identifier can be detected.

The base station further comprises a detection unit configured to detect a cell wherein the user equipment associated with the user equipment identifier can be detected, and a transmitter configured to signal to the radio network node an indication that the user equipment associated with the user equipment identifier has been detected in the detecting cell.

Thanks to the second cell identifier being obtained independently of the user equipment, embodiments herein provide a robust solution for cell identification, that does not need to rely on user equipment functionality.

A further advantage of embodiments herein, is that cell identification necessary for handover of a user equipment may be provided for without the user equipment having to decode and/or report for example a globally unique cell identifier of a candidate cell.

Moreover, embodiments herein may improve the realization of automatic cell relations in radio access systems.

Other objects, advantages and novel features of embodiments herein will become apparent from the following detailed description when considered in conjunction with the accompanying drawings and claims.

DETAILED DESCRIPTION

Embodiments may be exemplified in the following non-limiting description of embodiments.

Figure 1:
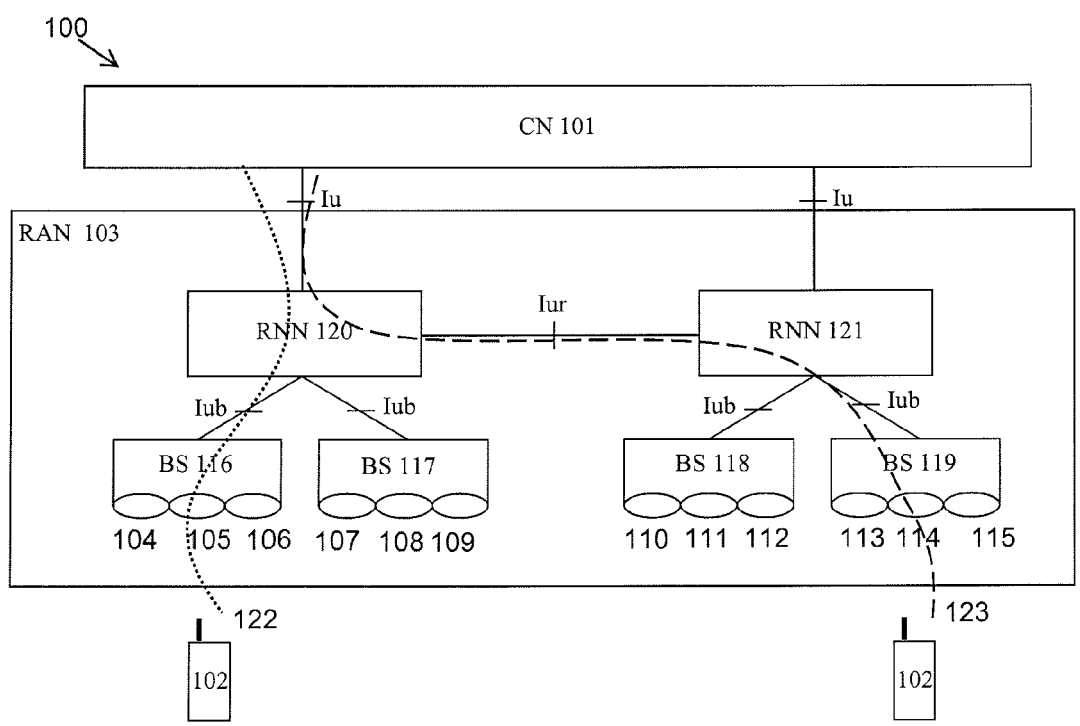
FIG. 1 is a schematic block diagram illustrating an embodiment of a radio communication system.

FIG. 1 depicts a radio communication system 100 in which embodiments herein may be implemented. The radio communication system 100 may be a WCDMA communication system, a GSM communication system, a PDC communication system, a IS95 communication system, a CDMA2000 communication system, a D-AMPS communication system, or any evolved communication system from any aforementioned systems, or another cellular communication system.

The radio communication system 100 comprises a core network (CN) 101. The core network 101 is managed by an operator to provide services to subscribers. A subscriber may be e.g. a mobile terminal with wireless capacity, a so called user equipment (UE) 102 to access the core network services.

The radio communication system 100 further comprises a radio access network (RAN) 103. The radio access network 103 is the part of the radio communication system 100 that is responsible for the radio transmission and control of the radio connection between the user equipments 102 and the core network 101.

The radio access network 103 is divided into so called cells, to provide radio coverage over a large geographical area. Each cell covers a smaller geographical area. Each cell is served by a base station that provides the radio coverage in a cell and communicates with user equipments within its range over the air interface, using a so called radio link. There may be more than one cell covering or overlapping the same geographical area.

In FIG. 1, twelve cells, indicated by numerals 104-115, are depicted. There is a first base station (BS) 116, serving cells 104, 105 and 106, a second base station 117, serving cells 107, 108 and 109, a third base station 118, serving cells 110, 111 and 112, and a fourth base station 119, serving cells 113, 114 and 115.

By "serving a cell" is understood that the base station handles the radio transmission and reception to user equipments within the cell.

Further depicted in FIG. 1 is a first radio network node (RNN) 120 which controls the first base station 116 and the second base station 117, and a second radio network node 121 which controls the third base station 118 and the fourth base station 119.

By "controlling a base station" is understood that the radio network node controls the radio resources and radio connectivity within a set of cells that is served by the base station. The radio network node 120 and/or the radio network node 121 may for example be radio network controllers.

As is illustrated in FIG. 1, the base stations and radio network nodes controlling the base stations are connected to each other. By way of example, in FIG. 1, the connections between controlling radio network nodes are referred to as Iur interfaces, and the connection between a base station and its controlling radio network node is referred to as a Iub interface. In some embodiments, the connections may be other interfaces.

The connections may be provided via land lines, radio link or a combination thereof.

Naturally, there may be more than two radio network nodes which are connected to each other.

Further, a radio network node may store information about controlled base stations. Such information may include the geographical locations of the base stations, as well as the topology of the network connecting the base stations to the different nodes. The signaling paths to/from the different base stations and radio network nodes may be vastly different.

The radio network node may also store mobility statistics per neighbor relation. Such statistics may comprise number of handovers per neighbor relation, number of successful handovers per neighbor relation, number of successful candidate cell radio link setups per neighbor relation, etc. This mobility statistics may also be aggregated per inter-radio network node relation, i.e. considering all neighbor relations originating from a cell served by a base station, controlled the radio network node in question to a cell served by a base station, controlled by a particular different radio network node.

FIG. 1 further illustrates how user data may be transferred within the radio communication system 100.

As shown by the dotted line 122, the communication between a user equipment 102 and the core network 101 may be handled directly through base station 116 serving the cell 112, which is the serving cell for the user equipment, and its controlling radio network node 120.

As shown by the dashed line 123, if the user equipment 102 is served by cell 114, the serving base station 119 is controlled by the radio network node 121, but the communication may still be transferred via the radio network node 120.

This is due to the fact that the radio network nodes in the radio access network may have different roles with regards to the user equipment.

In UTRAN, these are referred to as a Serving Radio Network Controller (SRNC) and a Drift Radio Network Controller (DRNC).

In the serving RNC role, the RNC is in charge of the connection with the user equipment and may have full control of this connection inside the RAN. The SRNC is connected to the core network.

In the drift RNC role, the RNC supports the serving RNC with radio resources for a connection with the user equipment that needs radio resources in cells controlled by the DRNC.

The radio access network may normally decide the role of an RNC (SRNC or DRNC) when the UE-RAN connection is first established.

Hence, as illustrated in FIG. 1, if the user equipment 102 is situated such that the connection with the RAN is first established through cell 105, the user equipment 102 becomes served by the base station 116, serving cell 105.

The base station 116 is in turn controlled by the radio network node 120, which, in this example, is an RNC. Hence, RNN 120 in FIG. 1 is assigned the serving RNC role for the connection illustrated by the dotted line 122.

The connection between the user equipments 102 and the base stations 104-115 is referred to as a radio link.

When the connection of the user equipment 102 is established to cell 105, served by the base station 116, RNN 120 configures the radio link(s) of the user equipment 102. This involves assigning a user equipment identifier associated to the user equipment. In UTRAN, this user equipment identifier is further associated to an uplink scrambling code that base stations can use to detect the user equipment.

As a user equipment moves between cells, the connection with the core network may be maintained by establishing radio communication via new cells, possibly also involving cells controlled by other RNCs (DRNCs). Such a situation is illustrated by the dashed line 123 in FIG. 1, where RNN 120 is still the serving RNC for the connection, but where, due to the UE mobility, the communication passes via cell 114, controlled by RNN 121 which is thus acting as DRNC for this connection.

To support mobility of user equipments between cells in a cellular radio network, so called handovers must be performed. Handovers are necessary for example when a user equipment, such as a mobile telephone, leaves one cell and moves into another cell. Otherwise, for example an ongoing call would be dropped, due to loss of radio coverage.

A handover may be a change of serving cell, so that a user equipment being served by one cell, becomes served by another, so called candidate cell, instead.

A handover may also mean addition of a radio link to a candidate cell without removing established radio links to other cells; or replacement of one of the existing radio links by a radio link to a candidate cell. Communication that involves a multitude of cells can be referred to as macro diversity, soft handover, softer handover or coordinated multipoint, etc. The set of cells with which the user equipment have radio links is referred to as the active set.

Hence, a handover includes the setup of a radio link connection between the user equipment and the candidate cell, so that the candidate cell may become the serving cell for the user equipment. The radio links are managed by the radio network controller, which receives measurement reports from user equipments about candidate cells and based on reported information decides about additions, replacements and removals of radio links.

The handling of handover of a user equipment from a currently serving cell to another, candidate, cell hence requires setup of a radio link between the user equipment and the cell it is handed over to.

A radio link setup procedure may comprise signalling of setup requests, and setup responses.

The radio link setup procedure may require the identification of such candidate cells, and hence the unique identity of the cell with which a radio link is to be established may have to be known.

To render the different cells in a radio communication system identifiable, each cell in the radio access network may broadcast a well-defined signature sequence that reveals its identity.

As previously mentioned in the background, some broadcast cell identities are reused in the radio access network, and are therefore not globally unique.

In UTRAN, the reused cell identity is the downlink scrambling code, and in LTE, it is the physical cell identity. The codes and sequences are enumerated and associated with a so called cell identifier. There are 512 different scrambling codes and associated cell identifiers in UTRAN, and 504 different reference symbol sequences and associated cell identifiers in LTE.

In addition to the reused cell identities, globally unique cell identifiers, so called Cell Global Identifiers (CGIs), may also be broadcast in a cell.

User equipments 102 regularly perform measurements to detect candidate cells for handover, and reports these to their serving base station and/or controlling radio network node.

In order to keep the candidate cell measurement procedures simple, all identities may not be decoded and/or reported by user equipments for candidate cell identification purposes.

Figure 2:
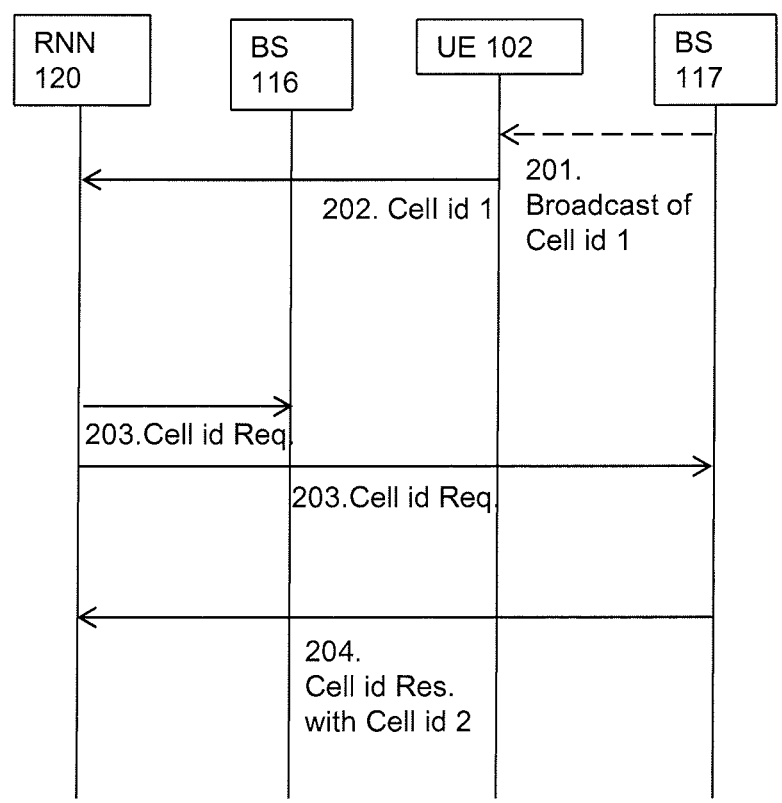
FIG. 2 is a combined signalling scheme and flowchart illustrating signalling in a radio communication system.

Embodiments herein, relating to methods for identifying a candidate cell for handover of a user equipment will now be described with reference to the combined signalling scheme and flowchart depicted in FIG. 2. The situation in the following example is, with reference to FIG. 1:

The user equipment 102 is situated in cell 105, which is its current serving cell. The cell 105 is served by base station 116, which in turn is controlled by the radio network node 120.

Action 201

The user equipment 102 detects a broadcast of a first cell identifier, related to Cell id 1 in the figure, associated with a candidate cell. In this example the candidate cell is cell 108 served by the base station 117. The first cell identifier may for example be a physical cell identifier such as the downlink scrambling code used by the cell 108, which may be a reused, i.e. non-unique, cell identifier.

Action 202

The user equipment 102 reports the first cell identifier to the RNN 120, which may be its serving radio network controller.

As previously mentioned, the RNN 120 may have assigned a user equipment identifier associated to the user equipment 102 when the connection of user equipment 102 was first established to cell 105. The user equipment identifier may be for example the user equipment uplink scrambling code.

In order to use the candidate cell 108 for handover, the radio network node may need additional candidate cell information, in addition to the reported first cell identifier of cell 108. Such additional candidate cell information may comprise a second cell identifier associated with cell 108. The second cell identifier may be a globally unique cell identifier for the cell 108.

Action 203

The radio network node 120 signals a cell identification request to at least one base station serving a cell using the first cell identifier. The cell identification request comprises a user equipment identifier associated with the user equipment 102. The cell identification request requests any cell wherein the user equipment 102 associated with the user equipment identifier can be detected.

By way of example, it is presumed that both cells 106 and 108 use the first cell identifier in question, i.e. the cell identification request is therefore sent to the base station 116 serving cell 106 and to the base station 117 serving cell 108.

Hence, the base stations 116 and 117 then, also indicated by actions 203, receive from the radio network node 120 the cell identification request comprising the user equipment identifier associated with the user equipment 102. The cell identification request requests any cell wherein the user equipment 102 associated with the user equipment identifier can be detected.

The base stations 116 and 117 may then use the user equipment identifier to find out if the user equipment 102 may be detected in any of the cells it is serving. This may for example be done by using so called matched filters to detect the user equipment identifier. Thanks to the cell identification request, which is a message comprising information about the user equipment in the form of the user equipment identifier, the recipients, in this case the base stations 116, 117, are able to search for the user equipment in question within their cells by trying to detect the user equipment identifier.

Action 204

The base station 117 hence detects the cell 108, wherein the user equipment 102 associated with the user equipment identifier can be detected, and signals to the radio network node 120, an indication that the user equipment 102 associated with the user equipment identifier has been detected in the detecting cell 108.

In this example, the indication is a cell identification response, related to Cell id Res in the figure, comprising a second cell identifier, related to Cell id 2 in the figure.

Further indicated by action 204, the radio network node 120 receives the cell identification response from the detecting base station 117. The detecting base station 117 serves the detecting cell 108, wherein the user equipment 102 associated with the user equipment identifier is detected. The cell identification response comprises the second cell identifier associated with the detecting cell.

Thanks to the second cell identifier, which may comprise a unique cell identifier for the detecting cell, the radio network node 120 is able to identify the candidate cell based on the received second cell identifier associated with the detecting cell 108. Such identification may be done for example by associating the first cell identifier to the second cell identifier.

Embodiments herein, relating to methods for identifying a candidate cell for handover of a user equipment will now be described with reference to the combined signalling scheme and flowchart depicted in FIG. 3. For the sake of clarity, this description also refers to numerals in FIG. 1. The situation in the following example is, with reference to FIG. 1:

The user equipment 102 is situated in cell 105, which hence is its current serving cell. The cell 105 is served by base station 116, which in turn is controlled by the radio network node 120.

Action 301

Figure 3:
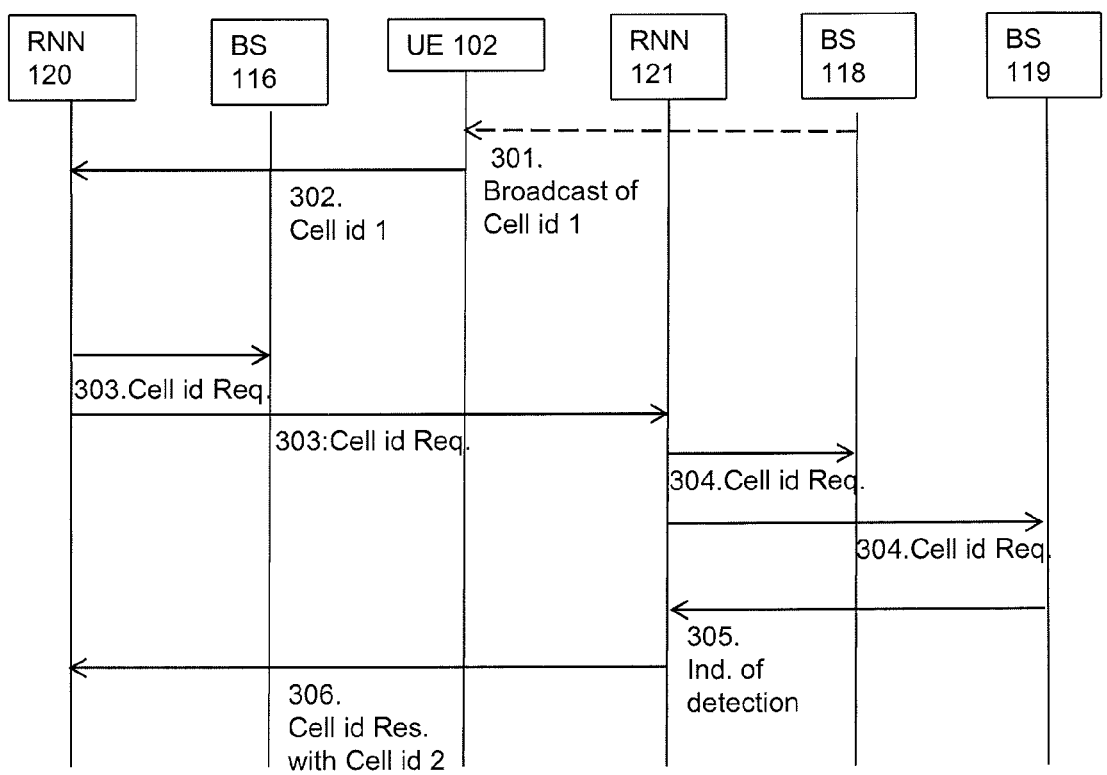
FIG. 3 is a combined signalling scheme and flowchart illustrating signalling in a radio communication system.

The user equipment 102 detects a physical channel broadcast of a first cell identifier, related to Cell id 1 in FIG. 3, associated with a candidate cell, which in this example is cell 114 served by the base station 119. The first cell identifier may be a physical cell identifier, such as the downlink scrambling code used by the cell 114.

Action 302

The user equipment 102 reports the first cell identifier to RNN 120, which may be its serving radio network controller SRNC.

As previously mentioned, the RNN 120 may have assigned a user equipment identifier associated to the user equipment 102 when the connection of user equipment 102 was first established. The user equipment identifier may be for example the user equipment uplink scrambling code.

In order to use the candidate cell 114 for handover, the radio network node 120 may need additional candidate cell information, in addition to the reported first cell identifier of cell 114. Such additional candidate cell information may comprise a second cell identifier associated with cell 114.

Action 303

The radio network node 120 hence signals, as indicated by actions 303, a cell identification request to at least one base station serving a cell using the first cell identifier, which cell identification request comprises the user equipment identifier, and requests any cell wherein the user equipment 102 associated with the user equipment identifier can be detected.

Referring again to FIG. 1, by way of example it is presumed that cells 104, 112 and 114 use the first cell identifier in question. Since the radio network node 120 controls the base station 116, it may be known to the radio network node 120 that this base station serves a cell which uses that first cell identifier, and the cell identification request may be sent specifically to this base station.

In this example, the cell identification request is also sent to the radio network node 121, which also controls base stations that serve cells which uses the first cell identifier in question.

The cell identification request is in this example hence also signalled via a second radio network node, in the form of the radio network node 121.

Regarding how the radio network node 120 may make a selection of which base stations and/or radio network nodes the cell identification request is to be sent to, this will be further discussed further down in this document.

Also indicated by 303, the radio network node 121 then receives from the radio network node 120, a cell identification request comprising a user equipment identifier associated with the user equipment 102. The cell identification request requests any cell wherein the user equipment 102 associated with the user equipment identifier can be detected.

Action 304

The radio network node 121 then signals the cell identification request to at least one base station serving a cell using the first cell identifier.

As mentioned above the radio network node 121 controls two base stations 118 and 119 which serve cells using the first cell identifier in this example. The radio network node 121 hence signals the cell identification request to both these base stations.

Therefore, also indicated by 304, the base stations 118 and 119 receive from the radio network node 121 the cell identification request comprising the user equipment identifier associated with the user equipment 102, which cell identification request requests any cell wherein the user equipment 102 associated with the user equipment identifier can be detected.

The base stations 116 and 117 may then use the user equipment identifier to detect the user equipment, associated with the user equipment identifier, in any of the cells it is serving. Again, this may for example be done by using so called matched filters to detect the user equipment identifier, which may for example be an uplink scrambling code.

The base station 119 then detects the cell 114, wherein the user equipment 102 associated with the user equipment identifier can be detected.

Action 305

The detecting base station 119 therefore signals to its controlling radio network node 121, an indication that the user equipment 102 associated with the user equipment identifier has been detected in the detecting cell 114.

Also indicated by 305, the radio network node 121 receives from the detecting base station 119 the indication that the user equipment 102 associated with the user equipment identifier has been detected in the detecting cell 114.

Action 306

The radio network node 121 then signals to the radio network node 120, a cell identification response comprising a second cell identifier associated with the detecting cell 114.

This second cell identifier may have been provided by the detecting base station together with the indication of detection, or derived by the radio network node 121, for example by association.

Further indicated by action 306, the radio network node 120 receives a cell identification response comprising a second cell identifier associated with the detecting cell 114.

The cell identification response may contain sufficient information to uniquely identify the candidate cell, so that the radio network node 120 may identify the candidate cell based on the received second cell identifier associated with the detecting cell 112, as well as its associated radio network node 121. Hence, thanks to the second cell identifier, the detected cell may be identified.

Referring again to UTRAN as an example, the above description would correspond to the following: RNN 120, which is the serving RNC for the user equipment 102, controls the serving cell 105, but some candidate cells to be evaluated are controlled by a different RNN 121, which may be referred to as a candidate RNC (caRNC). RNN 120 hence sends the cell identification request over Iur to the RNN 121, which is the caRNC.

FIG. 3 hence provides an example of inter-RNC cell identification.

Figure 4:
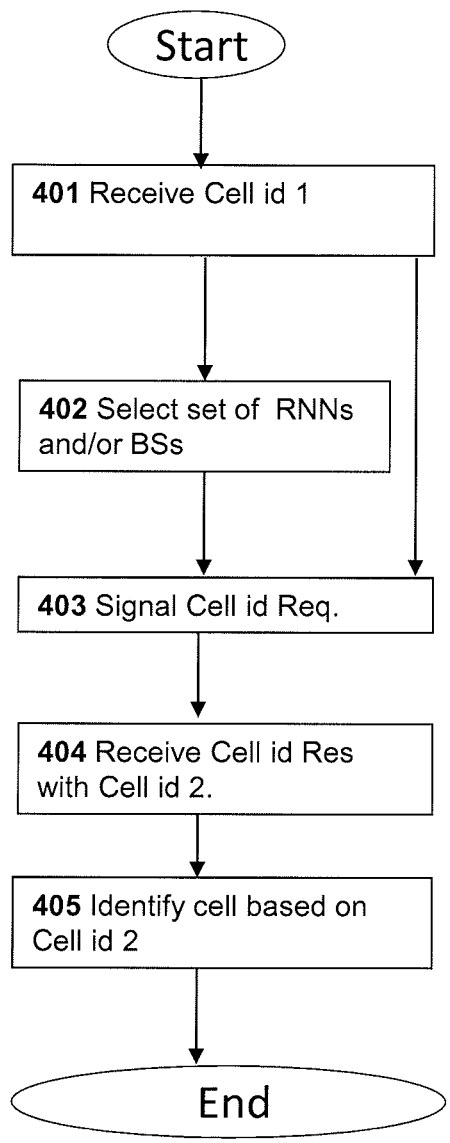
FIG. 4 is a flowchart depicting embodiments of a method in a first radio network node.

Embodiments herein, relating to a method in the first radio network node 120 for identifying a candidate cell for handover of a user equipment 102 will now be described with reference to the flowchart depicted in FIG. 4. As previously mentioned, the first radio network node 120 controls at least one base station 116, 117, and the first radio network node 120 and the candidate cell are comprised in the radio communication system 100. In some embodiments, the first radio network node 120 may be a radio network controller. The method comprises the following actions:

Action 401

The first radio network node 120 receives from the user equipment 102, a first cell identifier associated with the candidate cell.

The first cell identifier may for example be a physical cell identifier such as the downlink scrambling code.

Action 402

This is an optional action, according to which the first radio network node 120 may select a set of radio network nodes and/or base stations to which the cell identification request is to be sent.

This action reduces the amount of signalling.

The selected radio network nodes may for example comprise, possibly exclusively, radio network nodes controlling at least one cell that is neighbor to the serving cell for the user equipment 102 and/or, in the case the RNNs are RNCs, RNCs controlling at least one cell that is neighbor to one cell controlled by the user equipments serving RNC.

The selection may be based on a reference location.

In some embodiments, the selection may be based on geographical distance.

For example, radio network nodes controlling at least one cell within a pre-determined distance from the serving cell of the user equipment may be, possibly exclusively, selected.

The selection may be based on a distance within which the first radio network node 120 may consider candidate base stations. The distance may be pre-determined.

In some embodiments, the selection may comprise selecting radio network nodes and/or base stations within a pre-determined radius from the first base station receiving the first cell identifier associated with the candidate cell.

In some embodiments, the selection may be based on a signalling path.

In some embodiments, the selection may be based on inter-radio network node mobility statistics.

Action 403

The first radio network node 120 signals a cell identification request to at least one base station serving a cell using the first cell identifier. The cell identification request comprises a user equipment identifier associated with the user equipment 102. The cell identification request requests any cell wherein the user equipment 102 associated with the user equipment identifier can be detected.

The user equipment identifier may be for example a user equipment uplink scrambling code.

In some embodiments, the cell identification request may be signalled via a second radio network node 121 controlling at least one base station 118, 119 serving a cell using the first cell identifier.

This may be the case if it is possible that a cell controlled by a different radio network node 121 than the first radio network node 120 uses the first cell identifier, i.e. is the candidate cell in question. It may be the case that the controlling network node 121 for that cell is needed for providing the second cell identifier needed for identification of the candidate cell.

In some embodiments, the second radio network node 121 may be a radio network controller.

In some embodiments, the cell identification request further requests any cell also using the first cell identifier.

This may facilitate or improve the detection, since it may reduce the number of cells in which the user equipment 102 is searched for.

In some embodiments, the cell identification request may include an expiration timer within which the candidate cells are expected to search for the UE, and then abort.

In some embodiments, the cell identification request may be signalled in a radio link setup request message.

This may reduce the configuration efforts by reusing messages intended for radio link setup also for cell identification requests.

In some embodiments the radio link setup request message may have simplified radio link configuration, for example in the number of radio bearers, whether downlink is configured, etc. This simplified message may not be used for handover, since not all necessary information for a proper handover is included.

Action 404

The first radio network node 120 receives a cell identification response. The cell identification response comprises a second cell identifier associated with a detecting cell, served by a detecting base station, wherein the user equipment 102 associated with the user equipment identifier is detected.

The cell identification response may contain sufficient information to uniquely identify the candidate cell.

The cell identification response may be received directly from the detecting base station.

In some embodiments, the cell identification response may be received in a radio link setup response message.

The cell identification response may be received in a radio link setup response message in combination with a subsequent radio link restore indication.

This may reduce the configuration efforts by reusing messages intended for radio link setup also for cell identification.

In some embodiments, the cell identification response may be received via a second radio network node 121.

The second cell identifier comprised in the cell identification response received by the first radio network node 120 may have been provided by the detecting base station together with the indication of detection, or derived by the second radio network node 121, for example by association.

In some embodiments, the cell identification response may further comprise an identifier associated with the second radio network node 121.

For the purpose of radio network node identification, each radio network node may be associated with a unique radio network node identifier. In a neighbor cell relation there is sufficient information about the cells in question to provide for a possible handover of a user equipment between the cells experiencing the neighbor cell relation. Such requested information may comprise for example information regarding cell identity, as well as information regarding which radio network node that is controlling the base station serving the cell in question.

Action 405

The first radio network node 120 identifies the candidate cell based on the received second cell identifier associated with the detecting cell.

This may for example be done by associating the first cell identifier with the second cell identifier.

As previously mentioned, the first radio network node 120 may be a radio network controller.

This is the case for UTRAN, and for a UTRAN example, when the SRNC and controlling RNC are different, the UE would report the first cell identifier, which may be a detected scrambling code, to its SRNC. The SRNC would then inform the controlling RNC, controlling the cell which is the current serving cell for the user equipment, about the reported cell. It would then be the controlling RNC that would proceed to use the method according to the embodiments described above in relation to FIG. 4.

Figure 5:
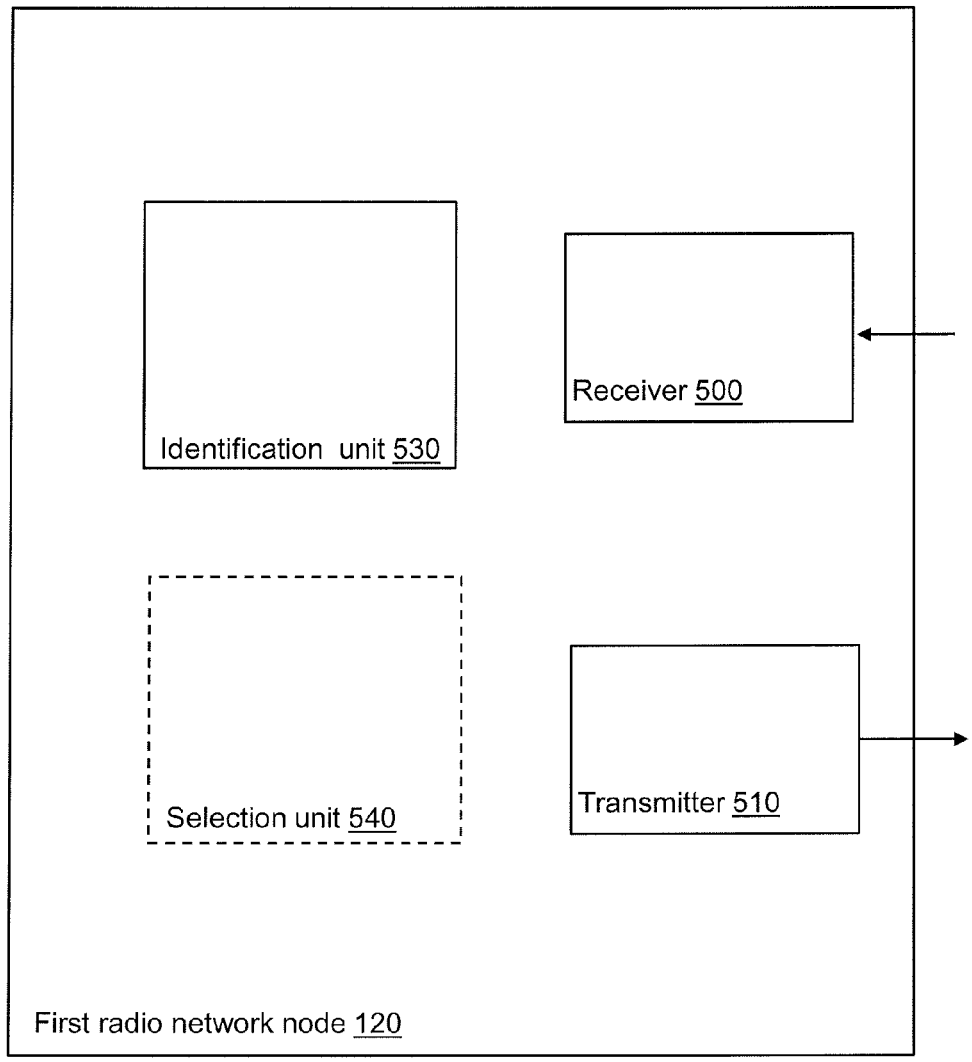
FIG. 5 is a schematic block diagram illustrating embodiments of a first radio network node.

To perform the actions above for identifying a candidate cell for handover of a user equipment 102 the first radio network 120 comprises an arrangement schematically depicted in FIG. 5. As mentioned above, the first radio network node 120 controls at least one base station 116, 117. The first radio network node 120 and the candidate cell are comprised in a radio communication system 100. In some embodiments the first radio network node 120 may be a radio network controller.

The term "configured to" used herein may also be referred to as "arranged to".

The first radio network node 120 comprises a receiver 500 configured to receive from the user equipment 102, a first cell identifier associated with the candidate cell.

The receiver 500 is further configured to receive a cell identification response comprising a second cell identifier associated with a detecting cell served by a detecting base station, wherein the user equipment identifier is detected.

In some embodiments, the receiver 500 may be configured to receive the cell identification response in a radio link setup response message.

The cell identification response may be received in a radio link setup response message in combination with a subsequent radio link restore indication.

This may reduce the configuration efforts by reusing messages intended for radio link setup also for cell identification responses.

In some embodiments, the receiver 500 may further be configured to receive the cell identification response via a second radio network node 121.

In some embodiments, the cell identification response may further comprise an identifier associated with the second radio network node 121.

For the purpose of radio network node identification, each radio network node may be associated with a unique radio network node identifier. In a neighbor cell relation there may be sufficient information about the cells in question to provide for a possible handover of a user equipment between the cells experiencing the neighbor cell relation. Such requested information may comprise for example information regarding cell identity, as well as information regarding which radio network node that is controlling the base station serving the cell in question.

The first radio network node 120 further comprises a transmitter 510 configured to signal a cell identification request to at least one base station 116, 117, 118, 119 serving a cell using the first cell identifier, which cell identification request comprises a user equipment identifier associated with the user equipment 102, and which cell identification request requests any cell wherein the user equipment 102 associated with the user equipment identifier can be detected.

In some embodiments, the transmitter 510 is further configured to signal the cell identification request via a second radio network node 121, controlling at least one base station 118, 119 serving a cell using the first cell identifier.

In some embodiments, the transmitter 510 may be configured to signal the cell identification request in a radio link setup request message.

This may reduce the configuration efforts by reusing messages intended for radio link setup also for cell identification requests.

The first radio network node 120 further comprises an identification unit 530 configured to identify the candidate cell based on the received second cell identifier associated with the detecting cell. This may be done by association, for example by associating the first cell identifier to the second cell identifier.

The first radio network node 120 may, in some embodiments, comprise a selection unit 540 configured to select a set of radio network nodes and/or base stations to which the cell identification request is to be sent.

In some embodiments, the selection unit 540 may further be configured to base the selection on geographical distance.

In some embodiments, the selection unit 540 may further be configured to select radio network nodes and/or base stations within a pre-determined radius from the first base station receiving the first cell identifier associated with the candidate cell.

In some embodiments, the selection unit 540 may be configured to base said selection on a signalling path.

In some embodiments the selection unit 540 may be configured to base said selection on inter-radio network node mobility statistics.

In some embodiments, the first radio network node 120 may comprise a handover unit that handles the neighbor cell relations and decides which cells should be connected by a radio link to the user equipment 102. Such a handover unit may initiate the method previously described in relation to FIG. 4.

Such a handover unit may initiate the method for example after receiving a first cell identifier if additional identity information about a candidate cell is needed for handover purposes.

Figure 6:
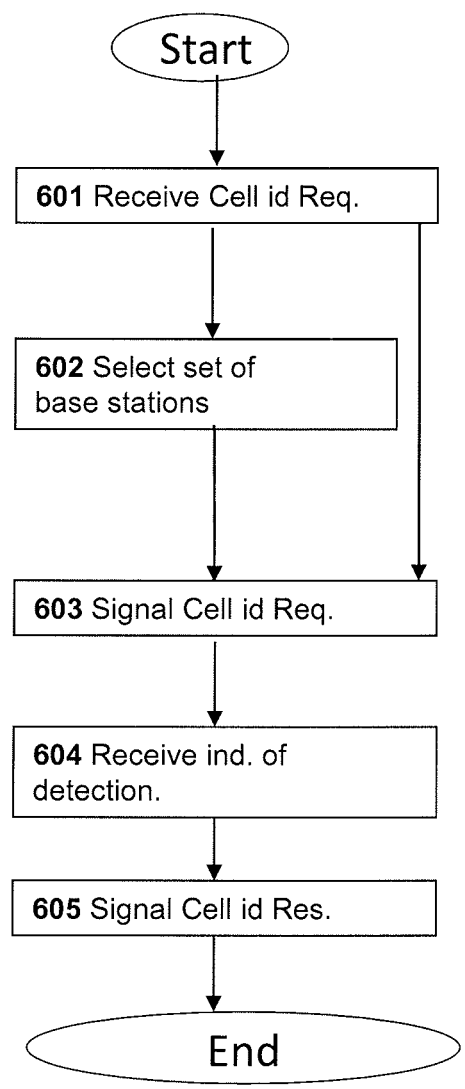
FIG. 6 is a flowchart depicting embodiments of a method in a second radio network node.

Embodiments herein, relating to a method in the second radio network node 121 for assisting the first radio network node 120 in identifying a candidate cell for handover of the user equipment 102, will now be described with reference to the flowchart depicted in FIG. 6. As previously mentioned, the second radio network node 121 serves a base station 118, 119, and the second radio network node 121, the first radio network node 120, and the candidate cell are comprised in the radio communication network 100. In some embodiments, the second radio network node 121 may be a radio network controller.

The method comprises the following actions:

Action 601

The second radio network node 121 receives from the first radio network node 120, a cell identification request comprising a user equipment identifier associated with the user equipment 102. The cell identification request requests any cell wherein the user equipment 102 associated with the user equipment identifier can be detected.

The user equipment identifier may be for example the user equipment uplink scrambling code.

In some embodiments, the cell identification request may further request any cell also using the first cell identifier.

The first cell identifier may for example be a physical cell identifier such as the downlink scrambling code.

In some embodiments, the cell identification request may be received in a radio link setup request message.

This may reduce the configuration efforts by reusing messages intended for radio link setup also for cell identification requests. In some embodiments the radio link setup request message may have simplified radio link configuration, for example in the number of radio bearers, whether downlink is configured, etc. This simplified message may not be used for handover, since not all necessary information for a proper handover may be included.

Action 602

This is an optional action, according to which the second radio network node 121 may select a set of base stations to which the cell identification request is to be sent.

This may reduce the required signalling.

In some embodiments, the selection may be based on geographical distance.

For example, in some embodiments, the cell identification request received from the first radio network node 120 may contain a reference location and possibly a distance within which the second radio network node shall consider candidate base stations.

Such a distance may be pre-determined, and/or be different for different radio network nodes.

In some embodiments, the selection may comprise selecting base stations within a pre-determined radius from the first base station receiving the first cell identifier associated with the candidate cell.

In some embodiments, the selection may be based on a signalling path.

In some embodiments, the selection may be based on inter-radio network node mobility statistics.

Action 603

The second radio network node 121 signals the cell identification request to at least one base station 118, 119 serving a cell using the first cell identifier.

Action 604

The second radio network node 121 receives from a detecting base station 118, 119 an indication that the user equipment 102 associated with the user equipment identifier has been detected in a detecting cell.

Action 605

The second radio network node 121 signals to the first radio network node 120, a cell identification response comprising a second cell identifier associated with the detecting cell.

The second cell identifier may have been provided by the detecting base station together with the indication of detection, or derived by the radio network node 121, for example by association.

In some embodiments, the cell identification response may further comprise an identifier associated with the second radio network node 121.

For the purpose of radio network node identification, each radio network node may be associated with a unique radio network node identifier. In a neighbor cell relation there may be sufficient information about the cells in question to provide for a possible handover of a user equipment between the cells experiencing the neighbor cell relation. Such requested information may comprise for example information regarding cell identity, as well as information regarding which radio network node that is controlling the base station.

In some embodiments, the cell identification response may be signalled in a radio link setup response message.

The cell identification response may be signalled in a radio link setup response message in combination with a subsequent radio link restore indication.

Figure 7:
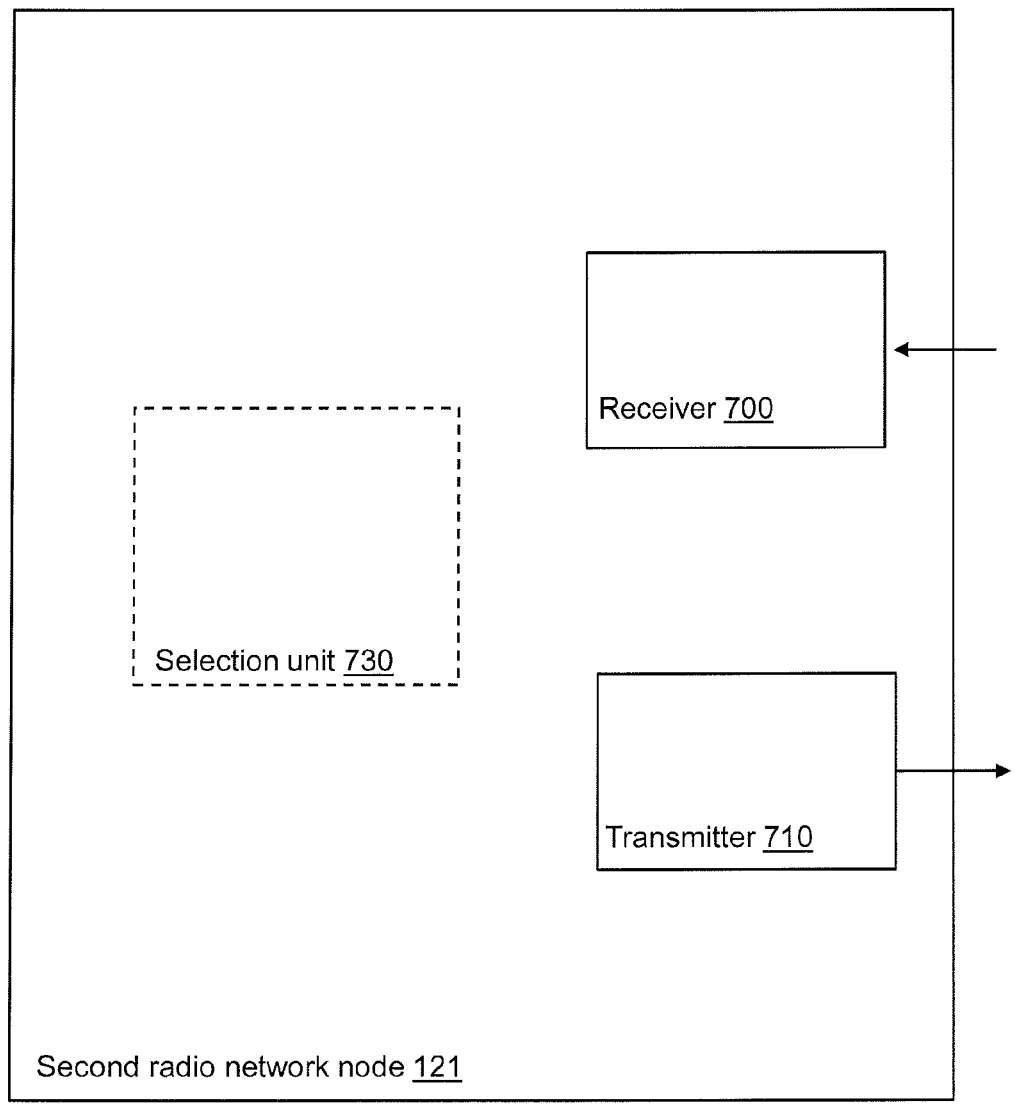
FIG. 7 is a schematic block diagram illustrating embodiments of a second radio network node.

To perform the actions above for assisting a first radio network node 120 in identifying a candidate cell for handover of a user equipment 102, the second radio network node 121 comprises an arrangement schematically depicted in FIG. 7.

As mentioned above, the second radio network node 121 serves a base station 118, 119. The second radio network node 121, the first radio network node 120, and the candidate cell are comprised in a radio communication network 100.

In some embodiments, the second radio network node 121 may be a radio network controller.

The term "configured to" used herein may also be referred to as "arranged to".

The second radio network node 121 comprises a receiver 700 configured to receive from the first radio network node 120, a cell identification request comprising a user equipment identifier associated with the user equipment 102, which cell identification request requests any cell wherein the user equipment 102 associated with the user equipment identifier can be detected.

In some embodiments, the receiver 700 may be further configured to receive the cell identification request in a radio link setup request message.

This may reduce the configuration efforts by reusing messages intended for radio link setup also for cell identification requests.

In some embodiments the radio link setup request message may have simplified radio link configuration, for example in the number of radio bearers, whether downlink is configured, etc. This simplified message may not be used for handover, since not all necessary information for a proper handover may be included.

The receiver 700 is further configured to receive from a detecting base station 118, 119 an indication that the user equipment 102 associated with the user equipment identifier has been detected in a detecting cell.

The second radio network node 121 further comprises a transmitter 710 configured to signal the cell identification request to at least one base station 118, 119 serving a cell using the first cell identifier.

In some embodiments, the cell identification request further requests any cell also using the first cell identifier.

In some embodiments, the cell identification request may include an expiration timer within which the candidate cells are expected to search for the UE, and then abort.

The transmitter 710 is further configured to signal to the first radio network node 120, a cell identification response comprising a second cell identifier associated with the detecting cell.

The second cell identifier may have been provided by the detecting base station together with the indication of detection, or derived by the radio network node 121, for example by association.

In some embodiments the cell identification response further comprises an identifier associated with the second radio network node 121.

In some embodiments, the transmitter 710 may be further configured to signal the cell identification response in a radio link setup response message.

The cell identification response may be signalled in a radio link setup response message in combination with a subsequent radio link restore indication.

The second radio network node 121, may in some embodiments comprise a selection unit (730) configured to select a set of base stations to which the cell identification request is to be sent.

In some embodiments, the selection unit 730 may further be configured to base the selection on geographical distance.

In some embodiments, the selection unit 730 may further be configured to select radio network nodes and/or base stations within a pre-determined radius from the first base station receiving the first cell identifier associated with the candidate cell.

In some embodiments, the selection unit 730 may be configured to base said selection on a signalling path.

In some embodiments the selection unit 730 may be configured to base said selection on inter-radio network node mobility statistics.

Figure 8:
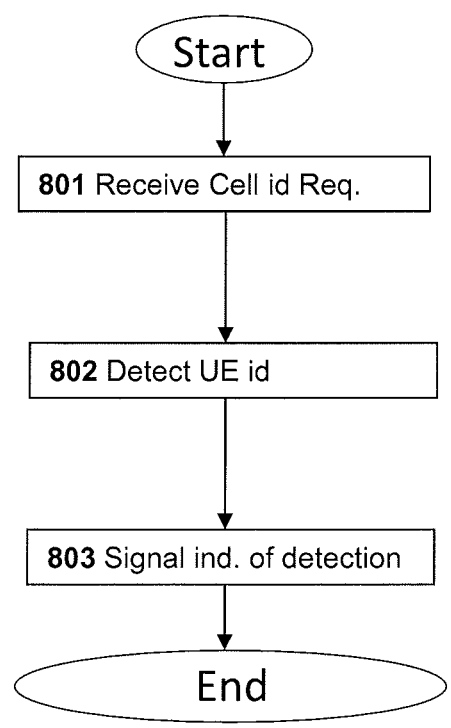
FIG. 8 is a flowchart of a method in a base station.

Embodiments herein, relating to a method in a base station 116, 117, 118, 119 serving at least one cell, for assisting a radio network node 120, 121 according to any one of the preceding claims in identifying a candidate cell for handover of a user equipment 102 will now be described with reference to the flowchart depicted in FIG. 8. As previously mentioned, the base station 116, 117, 118, 119, the radio network node 120, 121, and the candidate cell are comprised in a radio communication system 100.

The method comprises the following actions:

Action 801

The base station 116, 117, 118, 119 receives from the radio network node 120, 121 a cell identification request comprising a user equipment identifier associated with the user equipment 102. The cell identification request requests any cell wherein the user equipment 102 associated with the user equipment identifier can be detected.

In some embodiments, the cell identification request may further request any cell also using a first cell identifier.

Action 802

The base station 116, 117, 118, 119 detects a cell wherein the user equipment 102 associated with the user equipment identifier can be detected.

The base stations may perform the detection by using the user equipment identifier in a "probing procedure" to find out if the user equipment 102 may be detected in any of the cells it is serving. This may for example be done by using so called matched filters to detect the user equipment identifier, which may for example be an uplink scrambling code.

Action 803

The base station 116, 117, 118, 119 signals to the radio network node 120, 121 an indication that the user equipment 102 associated with the user equipment identifier has been detected in the detecting cell.

Figure 9:
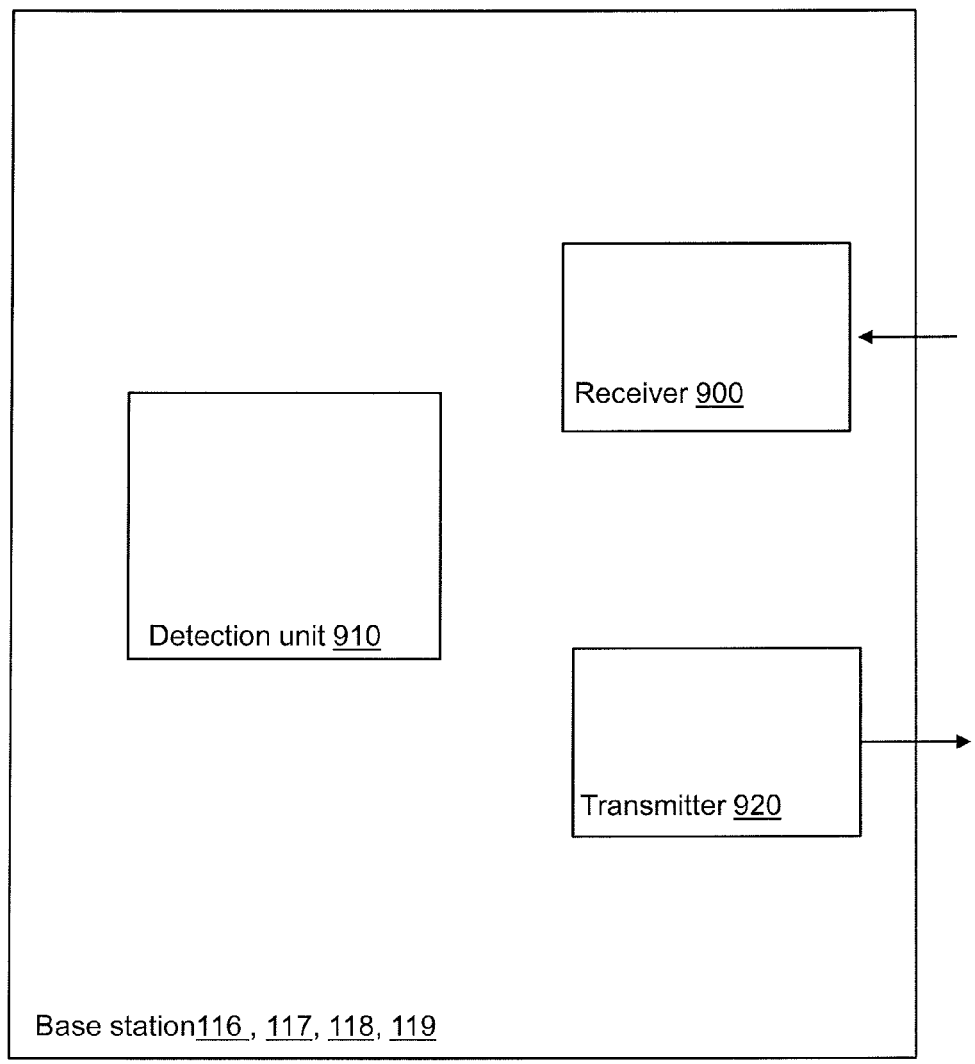
FIG. 9 is a schematic block diagram illustrating embodiments of a base station.

To perform the actions above for assisting a radio network node 120, 121 in identifying a candidate cell for handover of a user equipment 102, the base station 116, 117, 118, 119 comprises an arrangement schematically depicted in FIG. 9.

As mentioned above, the base station 116, 117, 118, 119 serves at least one cell, and the base station 116, 117, 118, 119, the base station 120, 121 and the candidate cell are comprised in a radio communication system 100.

The base station 116, 117, 118, 119 comprises a receiver 900, configured to receive from the radio network node 120, 121, a cell identification request comprising a user equipment identifier associated with the user equipment 102, which cell identification request requests any cell wherein the user equipment 102 associated with the user equipment identifier can be detected.

In some embodiments, the cell identification request further requests any cell also using a first cell identifier.

This may facilitate a selection of cells in which the user equipment is to be searched for, and hence limit the required signalling.

In some embodiments, the cell identification request may include an expiration timer within which the candidate cells are expected to search for the UE, and then abort.

The base station 116, 117, 118, 119 also comprises a detection unit 910 configured to detect a cell wherein the user equipment 102 associated with the user equipment identifier can be detected.

The detection unit 910 may further be configured to perform the detection by using the user equipment identifier in a "probing procedure" to find out if the user equipment 102 may be detected in any of the cells it is serving. This may for example be done by a so called matched filter arrangement configured to detect the user equipment identifier, which may for example be an uplink scrambling code.

The base station 116, 117, 118, 119 further comprises a transmitter 920 configured to signal to the radio network node 120, 121, an indication that the user equipment 102 associated with the user equipment identifier has been detected in the detecting cell.

An advantage of embodiments herein, is that cell identification necessary for handover of a user equipment may be provided for without the user equipment having to decode and/or report for example a globally unique cell identifier of a candidate cell.

This may simplify the candidate cell measurement procedures, compared to if for example unique cell identifiers were to be decoded and/or reported by a user equipment for candidate cell identification purposes.

Another advantage of embodiments herein, is that identification of a candidate cell for handover may not need to depend on user equipment measurements and/or user equipment capability to decode or forward a unique cell identifier.

Embodiments herein further provide efficient use of signalling resources.

Moreover, even if the user equipment supports decoding and reporting of the cell global identity, this information may not provide sufficient information for the purpose of establishing and/or handling a neighbor cell relation. For example, additional identity information about a radio network controller, controlling the base station that serves a user equipment, may also be required.

According to embodiments herein, such information may also be obtained in a cell identification response.

It is possible that a UE also decodes and reports the CGI (global identity), but that RNN identity information is also required to obtain complete neighbor relation information. The controlling RNN may then signal a cell identification request including at least the CGI to one or several candidate RNNs. The candidate RNN that controls the cell associated with the reported CGI may respond with a cell identification response comprising the required RNN identity information.

The embodiments are not limited to the above-described embodiments. Various alternatives, modifications and equivalents may be used.

The invention claimed is:

1. A method in a first radio network node for identifying a candidate cell for handover of a user equipment, which first radio network node controls at least one base station, which first radio network node and which candidate cell are comprised in a radio communication system, the method comprising:
   receiving from the user equipment, a first cell identifier associated with the candidate cell,
   signalling a cell identification request to at least one base station serving a cell using the first cell identifier, which cell identification request comprises a user equipment identifier associated with the user equipment, and which cell identification request requests any cell wherein the user equipment associated with the user equipment identifier can be detected,
   receiving a cell identification response comprising a second cell identifier associated with a detecting cell, served by a detecting base station, wherein the user equipment associated with the user equipment identifier is detected,
   identifying the candidate cell based on the received second cell identifier associated with the detecting cell.

2. The method according to claim 1, wherein the cell identification request is signalled via a second radio network node, controlling at least one base station serving a cell using the first cell identifier, and wherein the cell identification response is received via the second radio network node.

3. The method according to claim 1, wherein the cell identification request further requests any cell also using the first cell identifier.

4. The method according to claim 1, further comprising selecting a set of radio network nodes and/or base stations to which the cell identification request is to be sent.

5. The method according to claim 4, wherein the selection is based on geographical distance.

6. The method according to claim 5, wherein the selection comprises selecting radio network nodes and/or base stations within a pre-determined radius from the first base station receiving the first cell identifier associated with the candidate cell.

7. The method according to claim 4, wherein the selection is based on a signalling path.

8. The method according to claim 4, wherein the selection is based on inter-radio network node mobility statistics.

9. The method according to claim 1, wherein the cell identification request is signalled in a radio link setup request message.

10. The method according to claim 1, wherein the cell identification response is received in a radio link setup response message.

11. The method according to claim 1, wherein the first radio network node is a radio network controller.

12. The method according to claim 2, wherein the second radio network node is a radio network controller.

13. The method according to claim 2, wherein the cell identification response further comprises an identifier associated with the second radio network node.

14. A first radio network node for identifying a candidate cell for handover of a user equipment, which first radio network node controls at least one base station, which first radio network node and which candidate cell are comprised in a radio communication system, said first radio network node comprising:
- a receiver configured to receive from the user equipment, a first cell identifier associated with the candidate cell,
- a transmitter configured to signal a cell identification request to at least one base station serving a cell using the first cell identifier, which cell identification request comprises a user equipment identifier associated with the user equipment, and which cell identification request requests any cell wherein the user equipment associated with the user equipment identifier can be detected,
- wherein the receiver is further configured to receive a cell identification response comprising a second cell identifier associated with a detecting cell, served by a detecting base station, wherein the user equipment associated with the user equipment identifier is detected, and wherein the first radio network node further comprises
- an identification unit configured to identify the candidate cell based on the received second cell identifier associated with the detecting cell.

15. The first radio network node, according to claim 14, wherein the transmitter is further configured to signal the cell identification request via a second radio network node, controlling at least one base station serving a cell using the first cell identifier, and wherein the receiver is further configured to receive the cell identification response via the second radio network node.

16. The first radio network node according to claim 14, further comprising a selection unit configured to select a set of radio network nodes and/or base stations to which the cell identification request is to be sent.

17. The first radio network according to claim 16, wherein the selection unit is further configured to base the selection on geographical distance.

18. The first radio network node according to claim 17, wherein the selection unit is further configured to select radio network nodes and/or base stations within a pre-determined radius from the first base station receiving the first cell identifier associated with the candidate cell.

19. The first radio network node according to claim 16, wherein the selection unit is configured to base said selection on a signalling path.

20. The first radio network node according to claim 16, wherein the selection unit is configured to base said selection on inter-radio network node mobility statistics.

21. The first radio network node according to claim 14, wherein the transmitter is configured to signal the cell identification request in a radio link setup request message.

22. The first radio network node according to claim 14, wherein the receiver is configured to receive the cell identification response in a radio link setup response message.

23. The first radio network node according to claim 15, wherein the cell identification response further comprises an identifier associated with said second radio network node.

24. The first radio network node according to claim 15, wherein the first radio network node is a radio network controller.

25. A method in a second radio network node, serving a base station, for assisting a first radio network node according to claim 1 in identifying a candidate cell for handover of a user equipment, which second radio network node, which first radio network node, and which candidate cell are comprised in a radio communication system, the method comprising:
- receiving, from the first radio network node, a cell identification request comprising a user equipment identifier associated with the user equipment, which cell identification request requests any cell wherein the user equipment associated with the user equipment identifier can be detected,
- signalling the cell identification request to at least one base station serving a cell using the first cell identifier,
- receiving, from a detecting base station an indication that the user equipment-associated with the user equipment identifier has been detected in a detecting cell, and
- signalling to the first radio network node, a cell identification response comprising a second cell identifier associated with the detecting cell.

26. The method according to claim 25, further comprising selecting a set of base stations to which the cell identification request is to be sent.

27. A second radio network node, serving a base station, for assisting a first radio network node according to claim 1 in identifying a candidate cell for handover of a user equipment, which second radio network node, which first radio network node, and which candidate cell are comprised in a radio communication system, the second radio network node comprising:
- a receiver, configured to receive from the first radio network node, a cell identification request comprising a user equipment identifier associated with the user equipment, which cell identification request requests any cell wherein the user equipment associated with the user equipment identifier can be detected,
- a transmitter configured to signal the cell identification request to at least one base station serving a cell using the first cell identifier,
- wherein the receiver is further configured to receive from a detecting base station an indication that the user equipment associated with the user equipment identifier has been detected in a detecting cell, and wherein the transmitter is further configured to signal to the first radio network node, a cell identification response comprising a second cell identifier associated with the detecting cell.

28. The second radio network node according to claim 27, further comprising a selection unit configured to select a set of base stations to which the cell identification request is to be sent.

29. A method in a base station serving at least one cell, for assisting a radio network node according to claim 1 in identifying a candidate cell for handover of a user equipment, which base station, which radio network node and which candidate cell are comprised in a radio communication system, the method comprising:
- receiving, from the radio network node, a cell identification request comprising a user equipment identifier associated with the user equipment, which cell identification request requests any cell wherein the user equipment associated with the user equipment identifier can be detected,
- detecting a cell wherein the user equipment associated with the user equipment identifier can be detected,
- signalling to the radio network node, an indication that the user equipment associated with the user equipment identifier has been detected in the detecting cell.

30. A base station serving at least one cell, for assisting a radio network node according to claim 1 in identifying a candidate cell for handover of a user equipment, which base station, which radio network node and which candidate cell are comprised in a radio communication system, the base station comprising:

a receiver, configured to receive from the radio network node, a cell identification request comprising a user equipment identifier associated with the user equipment, which cell identification request requests any cell wherein the user equipment associated with the user equipment identifier can be detected, a detection unit configured to detect a cell wherein the user equipment associated with the user equipment identifier can be detected, and a transmitter configured to signal to the radio network node, an indication that the user equipment associated with the user equipment identifier has been detected in the detecting cell.

* * * * *